Oct. 1, 1935.   S. R. DIGHT   2,016,229
BOILER FEED WATER REGULATOR AND LIKE APPARATUS
FOR REGULATING LIQUID LEVELS
Filed May 19, 1934   3 Sheets-Sheet 3

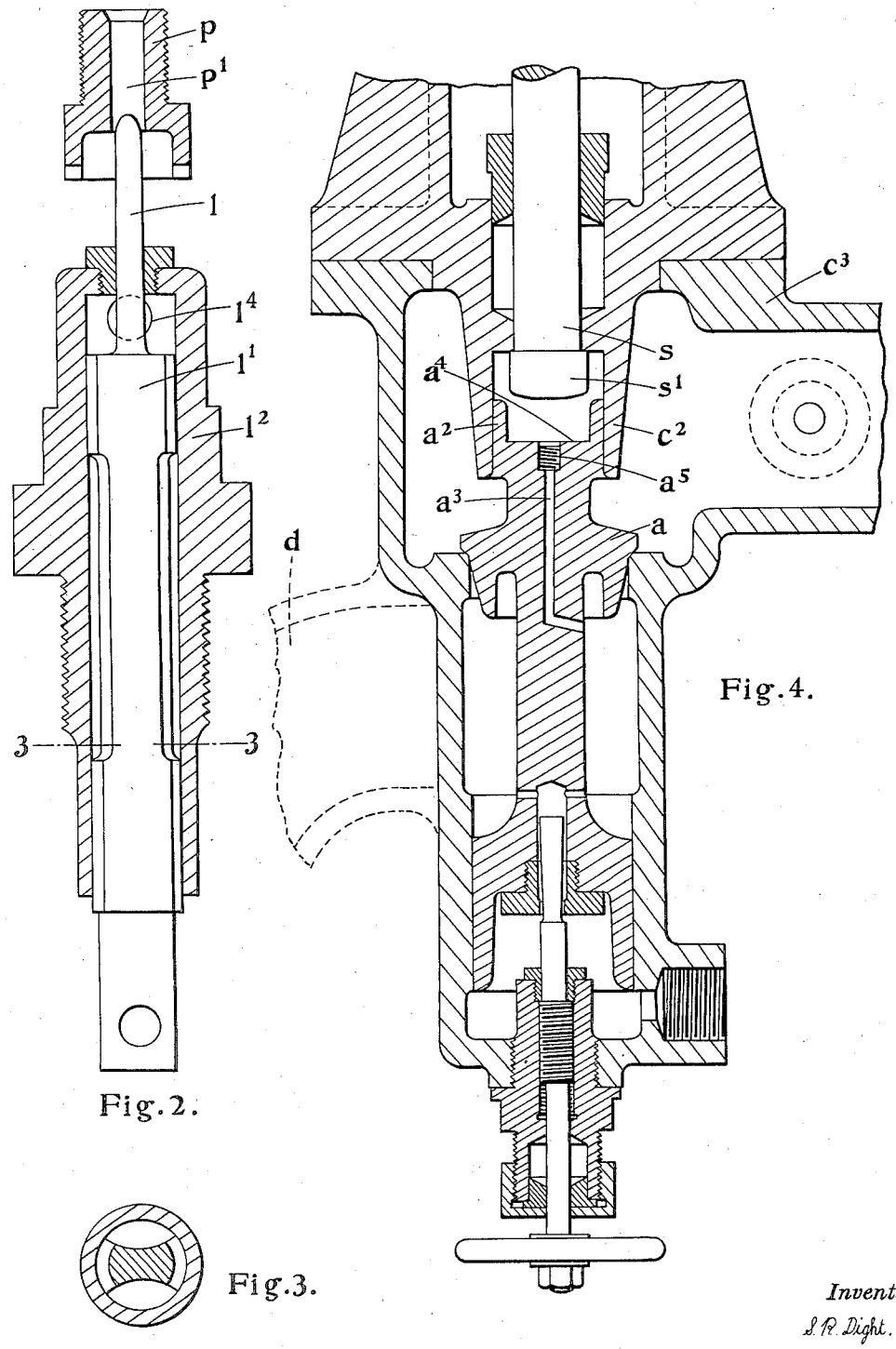

Inventor
S. R. Dight.
by
W. E. Evans
Attorney.

Patented Oct. 1, 1935

2,016,229

UNITED STATES PATENT OFFICE 2,016,229

BOILER FEED WATER REGULATOR AND LIKE APPARATUS FOR REGULATING LIQUID LEVELS

Sydney Rupert Dight, Haslar, Gosport, England, assignor to G. & J. Weir, Limited, Glasgow, Scotland Application May 19, 1934, Serial No. 726,523
In Great Britain March 21, 1933

6 Claims. (Cl. 137—101)

This invention relates to apparatus for the automatic regulation of the supply of liquid for the maintenance of a substantially constant level of liquid in a container, such for example, as a steam boiler from which the liquid is drawn off either as vapour or liquid, and is more particularly applicable to such apparatus comprising a pump system serving to feed liquid from a supply tank or reservoir to the working container in which the constant level of liquid is to be maintained under the control of a float or the equivalent. An example of the type of apparatus to which the invention relates is a feed water system for steam generator plants in which leakage of water from beneath a feed valve past a connected and leaking piston into a chamber beneath the piston is controlled by a valve operated by a float in a chamber which is in free communication with the steam boiler or which is provided within the boiler, whereby as the level within the boiler falls the float-operated valve stops or reduces the flow of leakage water from beneath the piston so that the pressure on the feed valve builds up until it is sufficient to open the feed valve against the pressure within the boiler and to allow feed water to be pumped into the boiler. Such a feed water system is described in detail in the specification of application for patent Serial No. 590,668, now Patent No. 1,980,749 issued Nov. 13, 1934.

The invention has among its objects to provide a feed valve which is especially sensitive and smooth in its operation, to provide for the return of the leakage water into the closed feed water system without necessarily passing by way of the feed tank and through the pump, to ensure that the minimum pressure acting on the piston is that existing in the container and generally to improve the operation and construction of such apparatus.

According to the invention the feed valve is subjected to the pressure of the feed acting in opposite directions on surfaces of different area, and the resulting differential pressure is operative in effecting the movement of the valve to establish and control the feed.

According to the invention, moreover, the feed valve may be subjected in the one direction to the action of the feed pressure, and in the opposite direction to the action of the boiler pressure and the feed pressure distributed over differing areas so that movement of the valve is determined by the surplus or differential pressure of the feed supply.

According to the invention, moreover, the feed pressure which is applied to the surface of smaller area of the feed valve may be rendered effective to operate upon the feed valve by means of a piston and cylinder, of which either the piston or the cylinder may be in fixed relation to the feed valve and may co-operate with a cylinder or piston in fixed relation to the valve casing.

According to the invention, also, the resultant total effective pressure acting upon the feed valve is determined by a control device operated by a float or the equivalent in such manner that the valve is opened or closed according to the level of liquid in the container.

According to the invention, moreover, in its application to a feed water supply system of the type described which operates as a closed feed system, the leakage liquid passing from the feed to the chamber or clearance space below the valve-operating piston is discharged into the container or into the float chamber or other vessel connected with the said container, and for this purpose the control valve operated by the float may be provided to afford a passageway for the leakage liquid into the said container or float chamber.

According to the invention, moreover, a non-return valve may be provided at a position in the pipe line connecting the feed valve and the control device controlling the flow of leakage water from the feed, so that in the case of loss of feed pressure due, for example, to the breakage of a pipe or the stoppage of a pump the feed valve remains closed under the pressure in the container, which is thus prevented from passing to the feed pipe line.

The invention further comprises the features hereinafter described and claimed.

The invention is illustrated by way of example in the accompanying diagrammatic drawings.

Figure 2 is a detail view to an enlarged scale of the float-operated valve, together with a sectional view of its casing.

Figure 3 is a cross-section taken in Figure 2 on the line 3—3.

Figure 4 is a sectional elevation illustrating a modified construction of the feed valve and its casing.

Figure 1:
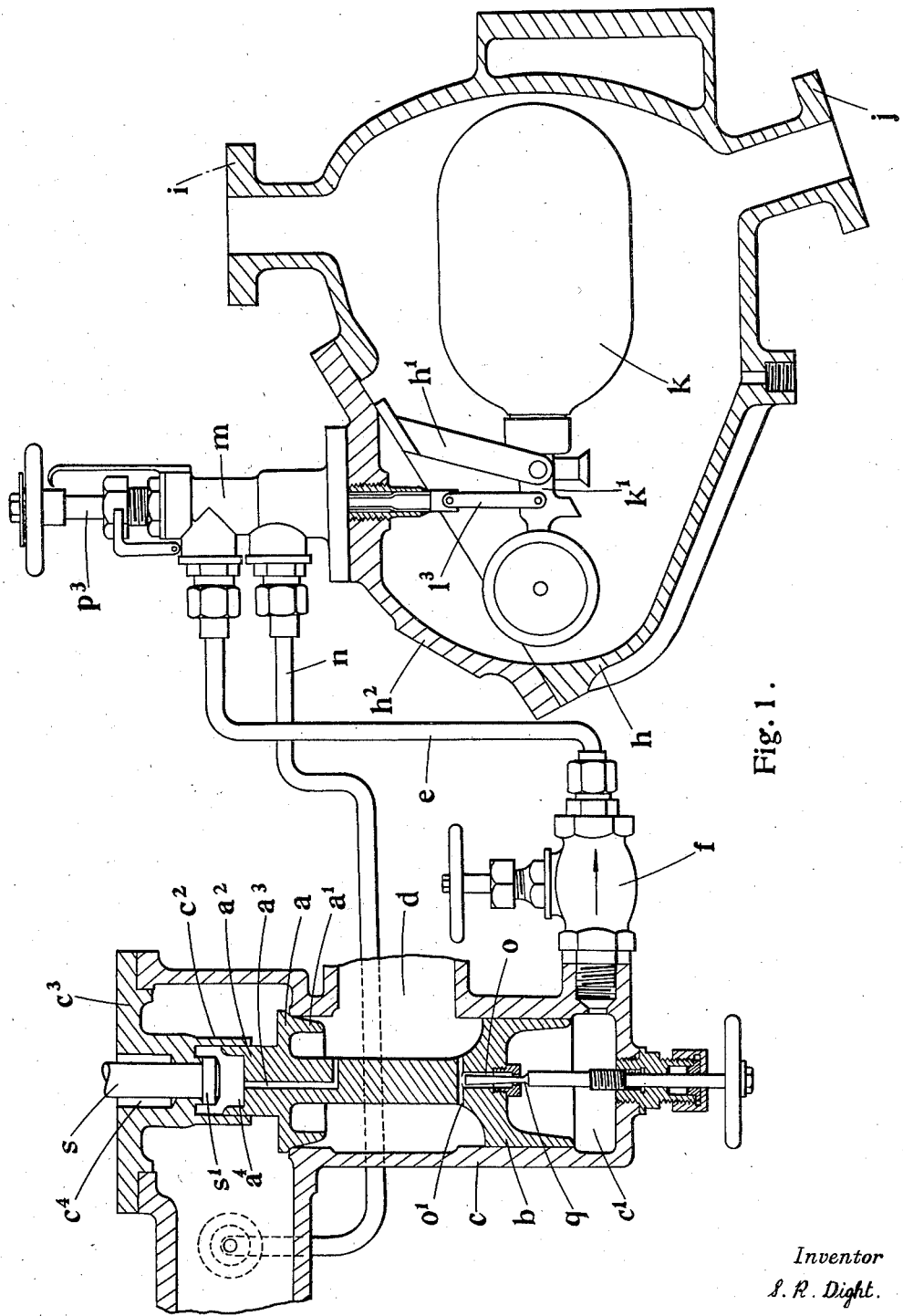
Figure 1 illustrates a boiler feed regulator provided in accordance with the invention, in part sectional elevation.

In carrying the invention into effect as illustrated in Figures 1 to 3 of the drawings, which show a boiler feed water regulator and feed system of the type hereinbefore described and referred to in the specification of application for patent Serial No. 590,668, now Patent No. 1,980,749, issued Nov. 13, 1934, the feed check valve $a$ has connected to it a piston $b$ adapted to have sufficient clearance to work freely within the cylinder $c$ forming part of the valve casing and so that leakage results through a substantially constant area past the periphery of the piston. The delivery from the feed pump enters the valve casing at $d$ between the valve $a$ and piston $b$. The chamber or clearance space $c^1$ beneath the piston $b$ is connected through a non-return valve $f$ by the pipe $e$ with the casing $m$ of a float-operated control valve $l$. The valve $a$ is advantageously provided with a skirting $a^1$ of coned or tapering form such that the area of opening on the rising of the valve gradually increases and thus contributes to the sensitive control of the valve.

According to the invention the piston $a$ is provided on its upper face with a cylindrical extension forming a piston $a^2$ which is adapted to operate within a cylinder $c^2$ formed as a downwardly extending boss upon the cover plate $c^3$ of the feed valve casing. Communication between the feed supply at $d$ and the interior of the cylinder $c^2$ is effected by a passage $a^3$ provided in the piston $a$ and its rod. A spindle $s$ may be provided mounted within a stuffing box $c^4$ provided in the cover plate $c^3$ and may be adapted to be screwed down by means of a hand wheel or other adjusting means for the purpose of bringing the enlarged head $s^1$ into a determined position of adjustment whereby it may limit the maximum opening of the feed valve or when it is desired to shut off the feed, into a position in which it maintains the feed valve $a$ upon its seat and also closes the passage $a^3$, the non-return valve $f$ being also closed to prevent leakage of water into the boiler or container.

The casing $m$ of the control valve $l$ is mounted upon the float casing $h$ which is preferably disposed close to the steam and water drum of the boiler and being in communication respectively at its upper and lower ends with the upper and lower parts of the drum by means of connection $i$ and $J$. The float $k$ is mounted upon a counterbalanced float lever $k^1$ pivotally carried on a bracket $h^1$ secured to and depending from the float casing cover plate $h^2$.

The valve $l$ is mounted at the upper end of a vertically disposed spindle $l^1$ axially movable within a sleeve or casing $l^2$ which is mounted by means of a screw thread upon the cover plate $h^2$ and enclosed within the valve casing $m$. The lower end of the spindle $l^1$ is connected to the float lever by a link $l^3$ so that variations in the positions of the float $k$ dependent upon variation in level of the water in the float chamber $h$ cause corresponding movements of the float-operated control valve $l$. This valve is advantageously formed at its upper end of a substantially tapering or pointed form and is adapted to co-operate with the central bore $p^1$ of a valve bush $p$ which is carried by a spindle $p^3$ so that its position in relation to the sleeve or casing $l^2$ may be adjusted. The pipe $e$ is connected to the valve casing $m$ at a position above the valve bush $p$ and communication with the bore $p^1$ of the valve bush is effected through suitable orifices or other openings provided in the supporting member by which the valve bush is carried from the spindle $p^3$. A pipe $n$ connects with the valve casing $m$ at a position below the valve bush $p$ and at its far end is connected to the delivery or boiler side of the feed valve casing $c$.

In addition the sleeve or casing $l^2$ is provided at the upper end with orifices $l^4$ and the spindle $l^1$ is provided of a non-circular cross-section, for example, as illustrated in Figure 3, in order that there may be a passageway for liquid from the upper end of the casing $l^2$ to the lower end and thus into the float casing $h$.

In addition to the leakage clearance of the piston $b$ the piston $b$ may also be provided with leakage passages $o$, $o^1$ to co-operate with a throttle valve $q$ in the manner described in the specification of the application Serial No. 590,668, now Patent No. 1,980,749, issued Nov. 13, 1934.

It will be understood that when the valve $a$ is in the closed position and no feed is required or being effected, apart from the leakage past the piston $b$, which is a negligible quantity, the pressure of the feed is substantially balanced in its action upon the upper surface of the piston $b$ and upon the under surface of the valve $a$ and since the chamber $c^1$ is in communication through the non-return valve $f$ and the float valve casing $m$ with the boiler or float casing $h$ no pressure above feed pressure or above boiler pressure tends to be established below the piston $b$, while the passage $a^3$ permits the feed pressure to be applied in the opposed direction upon the piston $a^2$, and such pressure is supplemented by the boiler pressure acting upon the annular surface $a^4$ of the valve $a$, which surface may have an area twice that of the piston $a^2$. There is therefore a pressure acting upon the valve $a$ to maintain it closed. When the level of liquid in the float casing $h$ falls the vertical spindle $l^1$ is lifted by the float $k$ and causes the valve $l$ to throttle or close the bore of the valve bush $p$. The passage for the leakage liquid from the chamber $c^1$ is therefore throttled or cut off, and accordingly a pressure lying between the limits of the feed pressure as a maximum and the boiler pressure as a minimum is built up below the piston $b$ with the result that a differential pressure between the pressure acting on the entire under surface of the piston $b$ and the feed pressure acting on the piston $a^2$ supplemented by the boiler pressure acting on the surface $a^4$ of the valve $a$ is established and the valve $a$ is smoothly and sensitively lifted without shock or hunting to the extent necessary to permit the admission of the feed water to the boiler to re-establish the level of water therein. While the level of liquid is being re-established in the float casing $h$ the valve $l$ is being withdrawn from the valve bush $p$ so that the passageway for leakage water from the chamber $c^1$ is gradually rendered operative again. It will be understood that by reason of the conditions under which the valve $a$ is operated and the fact that a relatively small differential pressure is required to move it, and furthermore owing to the fact that the piston $a^2$ working in the cylinder $c^2$, operates as a dash-pot to damp any tendency to a jerky movement of the valve $a$ the feed is effected in a particularly smooth and sensitive manner, without hunting of the valve and without shock, and so that a small difference in the level of liquid in the boiler is at once operative through the control valve to effect a corresponding feed.

In view of the construction of the valve spindle $l^1$ and the provision of the orifices $l^4$ in the sleeve or casing $l^2$, the leakage water passing through the valve bush $p$ may travel directly into the float casing $h$. Alternatively it may be delivered directly to the boiler by the pipe $n$. Thus, under normal conditions, the leak-off or operating water which is hot feed water is led into the boiler instead of being returned to the feed tank or feed system. There may thus be secured economy in weight and simplification of the mechanism in view of the reduction in the number of pipes and connections required and the small size necessitated for the moving valve parts.

The fact that the leakage from the chamber $c^1$ and the cylinder $c$, is fed into the float casing or into the boiler renders important the provision of the non-return valve $f$ so that in the event of an interruption in the feed supply whereby the pressure of the feed is lowered or destroyed, the boiler pressure may not be rendered operative to lift the valve $a$ and permit a discharge from the boiler through the feed by way of the feed system.

It will be understood that it is immaterial whether the feed valve is rendered rigid with the piston or with the cylinder by which the pressure of the feed is applied to close the valve. Figure 4 illustrates a modified construction of the apparatus according to the invention in which the valve $a$ is formed in fixed relation with the piston $a^2$, while the cylinder $c^2$ is integral with or carried by the cover plate $c^3$ of the valve casing $c$. As illustrated, the passage $a^3$ may be provided with a screw-threaded recess $a^3$ for a calibrated bush in order that the delivery of the feed liquid into the cylinder $c^2$ may be determined.

Figure 5:
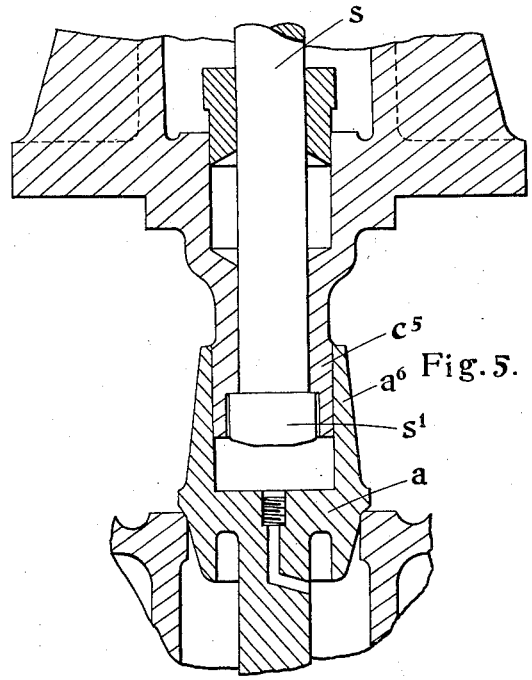
Figures 5 and 6 are further modifications of construction of the feed valve and the part of the casing with which it co-operates.

Figure 5 illustrates a construction of the valve $a$ in which it is formed integral with the cylinder $a^6$, while the piston $c^5$ is mounted upon the cover plate $c^3$ and is recessed to receive the head of the spindle $s$.

Figure 6:
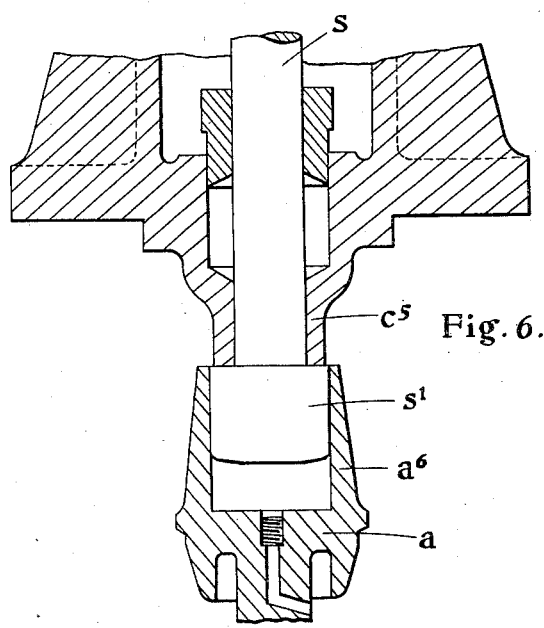

In Figure 6 a similar construction of the valve $a$ and cylinder $a^6$ is illustrated, but in this case the piston is entirely formed by the head $s^1$ of the spindle $s$.

It will thus be understood that the invention is not limited to particular constructional details and that these may be varied within the scope of the claims hereinafter set forth. Thus, the relative diameters of the operating piston and the feed valve may be varied according to the conditions under which the feed system is required to operate.

I claim:—

1. Apparatus for automatically regulating the feed of liquid into a container for the maintenance of a substantially constant level of liquid in the container, comprising a casing having a liquid feed inlet, a feed inlet valve exposed on one side to pressure from the liquid source and on its opposite side to pressure from the container and which tends to close under the pressure from the container, a piston in fixed relation to said feed inlet valve and exposed on one side to pressure from the source, a chamber in said casing in which the said piston moves, said chamber being normally in communication with the liquid source through the space in which the piston moves whereby feed pressure is caused to build up in said chamber to act on the opposite side of the piston, a float-operated valve responsive to the variations of the level of liquid in the container, a passage connecting said chamber with said float-operated valve, said float-operated valve controlling the building up of feed pressure within the said chamber, and an auxiliary piston and cylinder in said casing, one element of which is in fixed relation to the feed inlet valve, said cylinder being normally in free communication directly with the feed inlet for the building up of the feed pressure therein coacting with the pressure from the container on the feed valve to tend to close the feed valve.

2. Apparatus for automatically regulating the feed of liquid into a container for the maintenance of a substantially constant level of liquid in the container, according to claim 1, wherein the feed liquid enters the chamber by leakage past the piston and the leakage liquid is discharged under the control of the float-operated valve into the container.

3. Apparatus for automatically regulating the feed of liquid into a container for the maintenance of a substantially constant level of liquid in the container, according to claim 1, wherein the feed liquid enters the chamber by leakage through the piston and the leakage liquid is discharged under the control of the float-operated valve into a vessel connected with the said container.

4. Apparatus for automatically regulating the feed of liquid into a container for the maintenance of a substantially constant level of liquid in the container, according to claim 1, wherein the feed liquid enters the chamber by leakage past the piston and the leakage liquid is discharged by a by-pass passage in the float-operated control valve to the container.

5. Apparatus for automatically regulating the feed of liquid into a container for the maintenance of a substantially constant level of liquid in the container, according to claim 1, wherein the feed liquid enters the chamber by leakage past the piston and the float-operated valve is provided with a casing connected with the container for the discharge of the leakage liquid into the container.

6. Apparatus for automatically regulating the feed of liquid into a container for the maintenance of a substantially constant level of liquid in the container, according to claim 1, wherein the passage connecting the chamber with the float-operated valve is provided with a non-return valve.

SYDNEY RUPERT DIGHT.